Dec. 21, 1926.
C. M. ANDERSEN
NUT LOCK
Filed Jan. 5, 1925
1,611,628
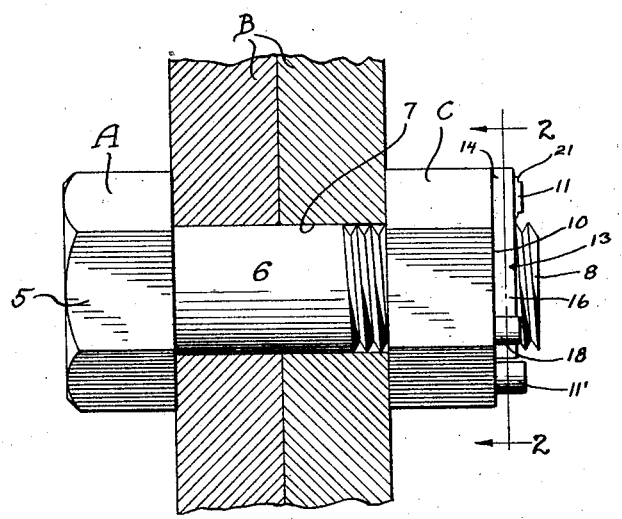
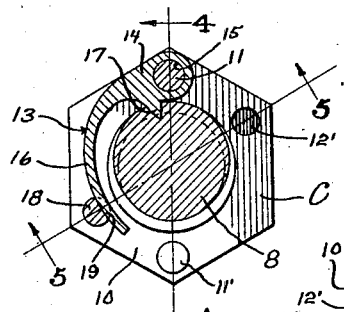
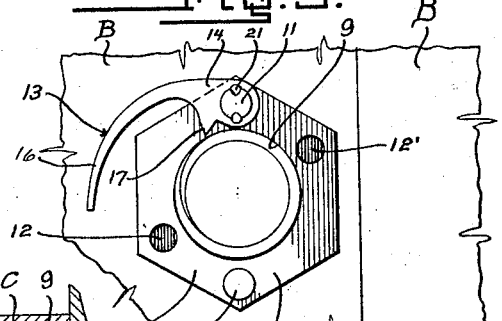
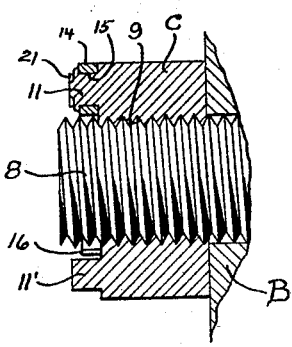
Inventor
Christian M. Andersen
By Lancaster Allwine
Attorneys Patented Dec. 21, 1926.

1,611,628

UNITED STATES PATENT OFFICE.

CHRISTIAN M. ANDERSEN, OF WHEELER RIDGE, CALIFORNIA.

NUT LOCK.

Application filed January 5, 1925. Serial No. 649.

My present invention relates to improvements in nut locks.

In the construction of railroad freight and passenger cars, where large sized bolts and nuts are used, it is found impractical in many instances to use the ordinary keys for preventing the locks from working loose and becoming lost. This prohibited use of the keys, due to the inability of being able to place the keys in proper locking relation with the nuts, because of their relation to an adjacent object, results in great loss of time and money by reason of the cars being crippled while on the road, due to the working loose or loss of such a nut as has not been properly locked in position.

It is therefore a primary object of this invention to provide a nut lock especially well adapted for use in connection with relatively large bolts and nuts, where it is impractical to use the customary retaining key for preventing loosening of the nut.

A further object of the invention is to provide a nut lock wherein the locking means is associated with the nut after the same has been turned into a holding position, thereby permitting of the ready placing of a wrench upon the nut for turning the same.

A still further object of the invention is to provide a nut lock which is extremely simple and efficient in operation, and embodying an arrangement whereby none of the threads of the nut are eliminated or distorted for permitting of the locking of the nut upon the shank of a standard bolt or other threaded article.

A still further object of the invention is to provide a nut lock wherein the locking element which is carried by the outer face of the nut, is adapted to be yieldably and releasably locked in holding engagement with the shank of the bolt in a manner as to permit of further adjustment of the nut should such become desirable.

Other objects and advantages of the invention will be apparent during the course of the following detailed description, taken in connection with the accompanying drawing, forming a part of this specification and in which drawing:

Figure 1 is a view partly in plan and partly in section, showing a nut lock constructed in accordance with my invention in use.

Figure 2 is a section on line 2—2 of Figure 1, looking in the direction of the arrows, and showing the nut in a locked position upon the bolt.

Figure 3 is a view in end elevation, showing the locking element secured to the outer face of the nut and in a position ready for swinging movement into operative engagement with the shank of the bolt.

Figure 4 is a section on line 4—4 of Figure 2, looking in the direction of the arrows; and Figure 5 is a section on line 5—5 of Figure 2, looking in the direction of the arrows.

Referring to the drawing in detail, and wherein similar characters designate corresponding parts throughout the several views; A designates a bolt or other screw threaded element; B elements through which the bolt A extends; and C a nut embodying the improved locking arrangement whereby when the nut is turned into operative relation upon the threaded element the nut may be locked against further rotation with respect to the threaded element.

In the example shown, the nut lock is shown in operative relation to an ordinary bolt having a head 5 and a shank 6 extending through a bore 7 of the elements B; with the threaded end portion 8 of the shank extending outwardly past one face of one of the elements B for receiving the nut C.

The nut C which may be of ordinary hexagonal formation, and embodying the usual screw threaded bore 9 for threaded engagement with the threaded shank portion 8, has provided on its outer end face 10, diametrically disposed pivot pins 11 and 11'. These pivot pins are preferably formed integral with the nut, but if so desired, these pins may be formed separate and secured to the outer face of the nut in any suitable manner. Provided in the face of the nut, in circumferential alignment between the pivot pins 11 and 11' are diametrically disposed recesses 12 and 12'—the recesses 12 and 12' being spaced remote from their co-acting pivot pins 11 and 11' respectively.

A locking lever 13 which is preferably formed of a good grade of steel, is formed with an enlarged head 14 having a bore 15 for receiving either of the pivot pins 11 or 11' and having extending from the head 14, an arcuate spring arm 16 being relatively long, and which arm is adapted for swinging movement across the outer face 10 of the nut. Provided at the inner concaved face of the lever 13, at a point adjacent the juncture of the head and arm, is a sharp spur or tooth 17 which is adapted to bite into the threads of the shank portion 8 when the locking lever 13 is swung inwardly toward the shank of the bolt. A locking pin 18 which is adapted to be inserted in either of the recesses 12 or 12′ is provided with a flattened portion 19 forming a shoulder 20 which is adapted to lie flush with the face 10 of the nut when the pin is inserted in one of the recesses. It will be noted that the free end portion of the spring arm 16 moves transversely across the open end of the recesses 12 and 12′ when the lever is swung into operative engagement with the shank of the bolt.

In operation, the nut C is first turned tight upon the threaded portion 8 of the bolt A. The head portion of the locking lever 13 is then positioned over one of the pivot pins with the concaved side of the spring arm 16 lying in confronting relation with the shank of the bolt, and secured in position upon the pin by upsetting the head of the pin as shown at 21. The free end of the lever is then sprung inwardly toward the shank of the bolt to a position for permitting of the locking pin being inserted into the recess 12 for yieldably retaining the spur 17 in biting engagement with the shank of the bolt. It will be noted that when the pin 18 and spring arm 16 are in operative relation, that the pin will be prevented from working out of the recess by reason of the shoulder 20 coming into contact with the inner edge of the arm. If desired, the spur 17 may be slightly driven into biting engagement with the shank of the bolt by lightly tapping the head of the locking lever with a hammer.

The object in so providing a number of co-operating pivot pins and recesses at the outer face of the nut, is to permit of the locking lever 13 being readily associated with the nut as when the threaded element upon which the nut is threaded, is so closely disposed to an element as at B′, as to prevent the proper placing of the locking lever.

While the locking lever has been shown applied to the face of a hexagonal shaped nut, it is thought to be apparent that the arrangement may be equally well applied to various other types of nuts.

Changes may be made to the form of the invention herein shown and described without departing from the spirit of the invention or the scope of the following claims:

I claim:

1. A nut lock comprising a polygonal shaped body portion provided with a bore, locking means mounted at one end face of the body portion and adapted for movement toward the bore thereof, and means for holding the locking means against movement away from said bore, including a locking pin removably associated with the face of the body portion and locked against displacement by said locking means.

2. A nut lock comprising in combination, a polygonal shaped element provided with a bore, and having a recess provided in the outer face thereof and spaced from said bore, a locking lever pivotally mounted at the outer face of the element and having its free end adapted for swinging movement across the opening of said recess and toward the bore of the polygonal shaped element, and means for preventing movement of the lever away from said bore, comprising a pin adapted to be inserted in said recess and having a flattened projecting portion to be engaged by said lever, said flattened portion providing a shoulder to engage the inner edge of the lever for retaining the pin in said recess.

CHRISTIAN M. ANDERSEN.